United States Patent
Gray, Jr. et al.

(10) Patent No.: US 8,522,546 B2
(45) Date of Patent: Sep. 3, 2013

(54) ON-DEMAND POWER BRAKE SYSTEM AND METHOD

(75) Inventors: Charles L. Gray, Jr., Pinckney, MI (US); Mark Stuhldreher, Pinckney, MI (US)

(73) Assignee: The United States of America, as represented by the Administrator of the U.S. Environmental Protection Agency, Washington, DC (US)

( * ) Notice: Subject to any disclaimer, the term of this patent is extended or adjusted under 35 U.S.C. 154(b) by 797 days.

(21) Appl. No.: 12/215,438

(22) Filed: Jun. 26, 2008

(65) Prior Publication Data

US 2009/0320464 A1    Dec. 31, 2009

(51) Int. Cl.
*B60T 13/14* (2006.01)

(52) U.S. Cl.
USPC .............................. 60/552; 60/413

(58) Field of Classification Search
USPC ................. 60/547.1, 552, 413, 442
See application file for complete search history.

(56) References Cited

U.S. PATENT DOCUMENTS

| | | | | |
|---|---|---|---|---|
| 3,345,817 | A | * | 10/1967 | Randol ............................ 60/552 |
| 3,733,966 | A | | 5/1973 | Brown, Jr. |
| 3,786,636 | A | * | 1/1974 | Kobashi ........................... 60/552 |
| 4,203,629 | A | * | 5/1980 | Bodin ........................... 60/547.1 |
| 4,362,019 | A | | 12/1982 | Bertone et al. |
| 4,566,275 | A | * | 1/1986 | Farr ................................ 60/554 |
| 5,150,575 | A | * | 9/1992 | Parker ........................... 60/547.1 |
| 5,715,680 | A | * | 2/1998 | Kruckemeyer et al. ......... 60/552 |
| 7,104,058 | B2 | * | 9/2006 | Matsuno et al. ................. 60/552 |
| 2003/0214179 | A1 | | 11/2003 | Kusano |

FOREIGN PATENT DOCUMENTS

| | | |
|---|---|---|
| DE | 3209337 A1 | 9/1983 |
| EP | 0308920 A2 | 3/1989 |
| SU | 895762 B | 1/1982 |
| SU | 1026644 A | 6/1983 |
| SU | 1204433 A1 | 1/1986 |

OTHER PUBLICATIONS

"Hydro-Max Hydraulic Brake Booster and Master Cylinder," Technical Manual, Robert Bosch Corporation, 2002, 28 pages.
"Hydraulic Power Brake (HPB)," ArvinMeritor, 88 pages.
Hydraulische ATE Bremskraftverstärkungsanlage, published at least as early as Jun. 26, 2007, 1 page.

* cited by examiner

*Primary Examiner* — F. Daniel Lopez
(74) *Attorney, Agent, or Firm* — David H. Read (57) ABSTRACT

A hydraulic brake system includes a piston that separates a first pressure chamber from a second pressure chamber of a cylinder bore. A valve within a piston bore is movable between three positions. In the first position, the first and second pressure chambers are in fluid communication with a low-pressure fluid supply; in the second position, the second pressure chamber is isolated from the first pressure chamber and the low-pressure fluid supply; in the third position, a high-pressure fluid supply is in fluid communication with the second pressure chamber, allowing high-pressure fluid to flow into the second pressure chamber. High pressure in the second pressure chamber moves the boost piston, applying boosted braking pressure to a vehicle brake. Pressure in the second chamber against a surface of the valve biases the valve toward the first position. An accumulator stores pressurized fluid and provides the high-pressure fluid supply, enabling on-demand brake boosting force during engine-off operation of a hybrid vehicle.

19 Claims, 6 Drawing Sheets

ON-DEMAND POWER BRAKE SYSTEM AND METHOD

BACKGROUND

1. Technical Field

The disclosed embodiments of the invention are related in general to hydraulically boosted brake systems, and in particular, to such systems in which high-pressure fluid flows in a power booster only while a braking event is in progress.

2. Description of the Related Art

Modern vehicles are generally provided with features to assist the driver in controlling the vehicle, such as power steering and power brakes. With regard to power brakes, a device senses the driver's pressure on the brake pedal and applies an increased pressure to the brakes of the vehicle, proportionate to the pressure applied by the driver. In vehicles that employ gasoline powered engines, vacuum from the engine is typically used in a booster device to amplify the pressure applied to the brake pedal. Diesel engines do not produce vacuum, so diesel powered vehicles employ one of a number of alternatives. In very large vehicles such as freight and delivery vehicles, a separate compressor is typically provided to produce air pressure or vacuum to power the brake booster. In passenger vehicles, a hydraulic booster is often used, which is driven by a hydraulic pump that also generally powers the power steering booster.

Figure 1:
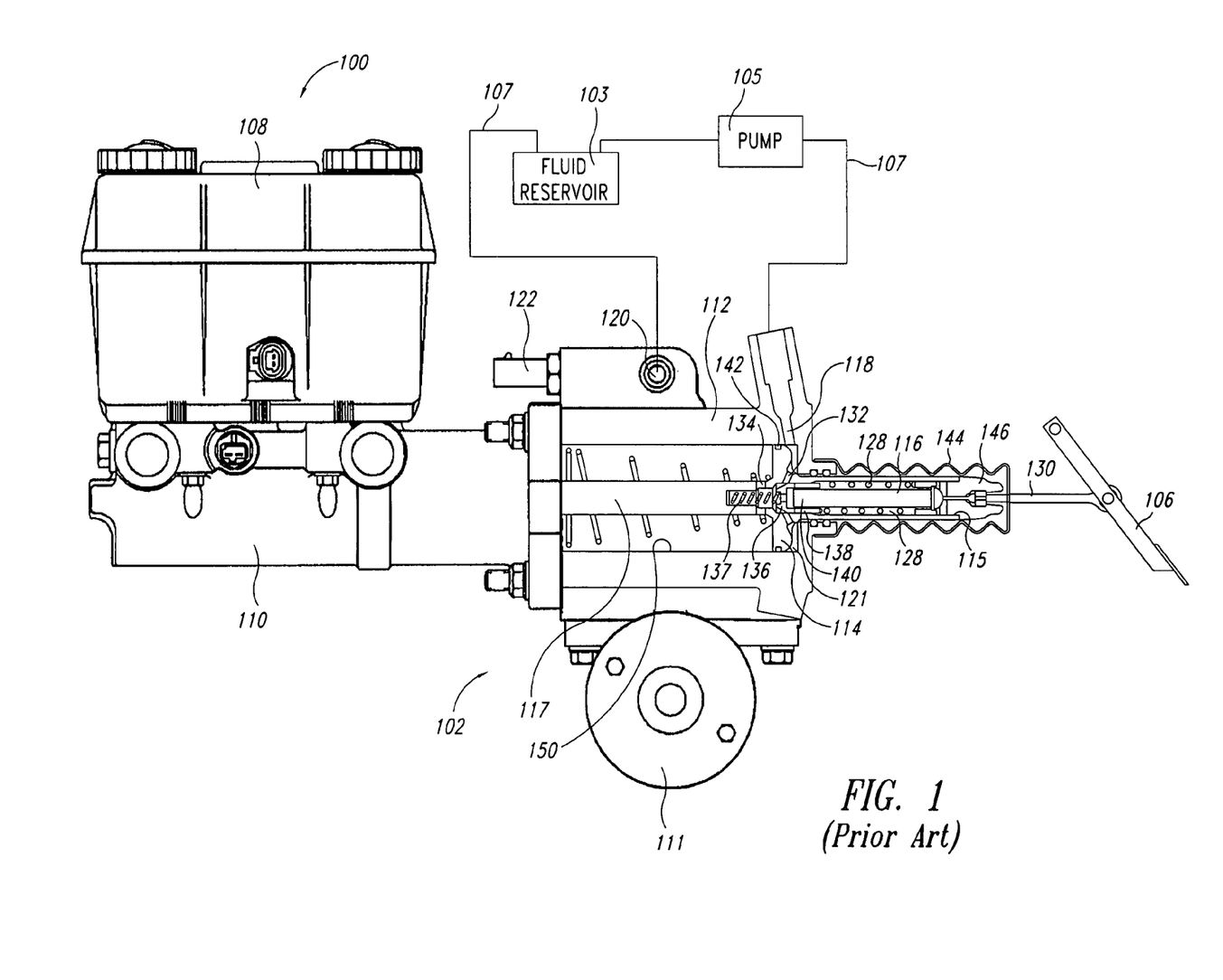
FIG. 1 shows elements of a known hydraulic braking system.

FIG. 1 shows components of a hydraulically boosted braking system 100 that includes a master cylinder 110, a brake fluid reservoir 108, and a partial cut-away view of a hydraulic power brake booster 102. The system also includes a hydraulic fluid reservoir 103, a hydraulic fluid pump 105, fluid transmission lines 107, and an electric auxiliary fluid pump 111. The vehicle brake pedal 106 is coupled to the brake booster 102 by a pushrod 130.

The brake booster 102 includes a housing 112 with inlet and outlet fluid ports 118, 120, respectively, and a cylinder bore 150. A power piston 114 is positioned within the cylinder bore 150 and includes a piston bore 115 and an output pushrod 117. The power piston 114 includes a seal 142 that contacts a wall of the cylinder bore 150 and separates a low-pressure side 119 of the cylinder bore from a high-pressure side 121 of the cylinder bore 150. The power piston 114 is provided with low-pressure-side fluid vents 134 and high-pressure-side fluid vents 132. A poppet valve 136, a valve return spring 137, a valve rod 116, a reaction piston 138, and a feedback spring 128 are positioned within the piston bore 115 of the power piston 114, and a valve rod retainer 146 forms a seal at an open end of the piston bore 115 through which the input pushrod 130 contacts the valve rod 116. A boot 144 covers and protects a portion of the power piston 114 that extends from the booster housing 112. A flow switch 122 is positioned in the casing 112 adjacent to the fluid outlet 120.

In operation, the pump 105 is coupled to a drive shaft of the engine of the vehicle, generally via the fan belt, and is in constant operation while the engine is running. As long as there is no pressure applied to the brake pedal 106, the power piston 114 is positioned at the far right of the cylinder bore 150, as viewed in FIG. 1. Pressurized fluid from the pump 105 enters the cylinder bore 150 via the fluid inlet 118 on the high-pressure side of the power piston 114. The fluid passes into the piston bore 115 via the high-pressure-side vents 132, flows past the poppet valve 136, and exits the piston bore 115 via the low-pressure-side vent 134 to the low-pressure side 119 of the cylinder bore 150. The fluid exits the cylinder bore 150 via the fluid outlet 120 and thence to the fluid reservoir 103.

When the driver applies pressure to the brake pedal 106, the pushrod 130 transmits the pressure to the valve rod 116, moving the valve rod to the left, compressing the feedback spring 128. When the end 140 of the valve rod 116 contacts the poppet valve 136, the poppet valve 136 also begins to move to the left into a narrowed portion of the piston bore 115, which begins to throttle the flow of fluid through the piston bore. As fluid flow is impeded, fluid pressure increases in the high-pressure side of the cylinder bore 150, which causes the power piston 114 to begin to move to the left. The movement of the power piston 114 is transmitted by the output pushrod 117 to a piston of the master cylinder 110, thereby applying boosted braking force to the brakes. Meanwhile, if the driver depresses the brake pedal 106 a short distance and then holds, the power piston 114 moves to the left away from the valve rod 116, which allows the poppet valve 136 to withdraw slightly from the narrowed portion of the piston bore 115 and permit more fluid to pass. When an equilibrium is reached between fluid pressure on the high-pressure side 121 of the cylinder bore and a combination resistance from the master cylinder and the increased bias of the return spring 126 on the low-pressure side 119 of the cylinder bore, the power piston stops moving and remains stationary until the driver either presses harder on the brake pedal 106 or releases pressure from the brake pedal.

When the brake is applied, and fluid pressure increases on the high-pressure side of the cylinder bore 150, the increased fluid pressure also bears against the leftmost side of the reaction piston 138, which, in response thereto, moves to the right, which increases the bias of the feedback spring 128, thereby applying a proportional feedback pressure to the brake pedal 106 via the pushrod 130. If the driver applies greater pressure to the pedal 106, the power piston 114 will move further to the left before the pressure in the high-pressure side of the cylinder bore 150 rises sufficiently to move the reaction piston 138 far enough to apply a feedback pressure equal to the input pressure. When the driver releases pressure from the brake pedal 106, the valve rod 116, biased by the feedback spring 128, moves to the right, allowing the poppet valve 136, biased by the valve return spring 137, to move to a fully open position, which in turn allows fluid to again flow freely through the piston bore 115 of the power piston 114, thereby permitting the power piston 114 to move to the right to its full limit of travel.

It can be seen that, except when the brake is applied with maximum pressure, thereby completely closing the poppet valve 136, there is a continuous flow of hydraulic fluid through the booster 102. In the event of a malfunction that results in a loss of fluid flow into the fluid inlet 118, the flow switch 122 senses the resulting drop in fluid flow from the fluid outlet 120, and activates the electric auxiliary pump 111, which begins circulating fluid through the cylinder bore 150 to provide backup boosting power to the brake booster 102.

BRIEF SUMMARY

According to an embodiment of the invention, a hydraulic brake booster is provided for on-demand use in a motorized vehicle, in which the booster draws high-pressure hydraulic fluid only while a braking event is in progress.

According to an embodiment of the invention, a hydraulic brake booster includes a housing that has a cylinder bore having high- and low-pressure fluid supply ports. A boost piston within the cylinder bore has a piston seal that separates a first pressure chamber of the cylinder bore from a second pressure chamber of the cylinder bore, and a piston bore extending axially within the piston. Movement of the boost piston is transmitted by an output shaft to a master brake cylinder to apply braking force to the vehicle brakes. A valve positioned within the piston bore is movable to any of three valve positions.

While the valve is in the first valve position, the high-pressure fluid port is closed and the first and second pressure chambers of the cylinder bore are both in fluid communication with the low-pressure fluid supply port. While the valve is in the second valve position, the high-pressure fluid port is closed, and the second pressure chamber is isolated from the first pressure chamber and from the low-pressure fluid supply port. While the valve is in the third valve position, the high-pressure fluid port is in fluid communication with the second pressure chamber, allowing high-pressure fluid to flow into the second pressure chamber. A pressure imbalance between the first and second pressure chambers moves the boost piston in a first direction, extending the output shaft to apply boosted brake pressure to a piston of the master brake cylinder. The third valve position comprises a range of positions of the valve. At a first extreme, the fluid passage through which high-pressure fluid flows into the second chamber is very small, such that a rise in pressure in the second chamber is gradual. As the valve moves toward a second extreme of the third position, the passage continues to open, such that, at the second extreme, the pressure in the second chamber increases extremely quickly, resulting in a maximum force being applied to the brakes of an associated vehicle almost instantaneously.

DETAILED DESCRIPTION

While the brake booster system described above with reference to FIG. 1 is generally effective and reliable, it suffers from a number of deficiencies. For example, the hydraulic pump 105 operates at a rate that corresponds to the engine speed. Because the flow capacity of the pump 105 must be sufficient to brake the vehicle while the engine is idling, its output flow and pressure, and the corresponding load on the engine, will be far more than necessary when the engine is running at higher rpm's. Additionally, because the pump is in constant operation, even while the brakes are not in use, it represents a constant drag on the engine, and therefore has a significant impact on the fuel economy of the vehicle. In some cases the pump can consume more than 3% of the total energy produced by the engine. Furthermore, it will be recognized that when the engine is not in operation, the system of FIG. 1 cannot provide a boost to the brakes, because the hydraulic pump 105 is driven by an engine belt, and the auxiliary pump 111 is powered by the electrical system of the engine. The auxiliary pump 111 is provided as an emergency back-up rather than as a primary fluid pump.

The drawbacks described above are of particular concern with regard to the design of highly fuel-efficient vehicles. For example, hybrid vehicles, which employ an internal combustion engine and a secondary drive motor, may operate for extended periods with the engine off, operating under stored energy. During such times, the mechanically driven pump 105 would not be in operation, while an electrically driven pump such as the auxiliary pump 111 will tend to unnecessarily deplete the available stored energy.

Figure 2A:
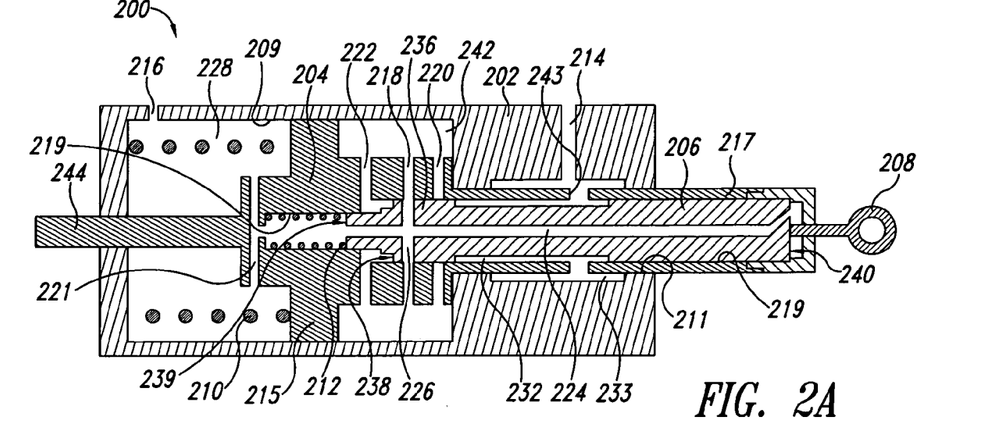
FIGS. 2A-2C show a diagrammatical representation of a hydraulic brake booster according to a first embodiment of the invention.
Figure 2B:
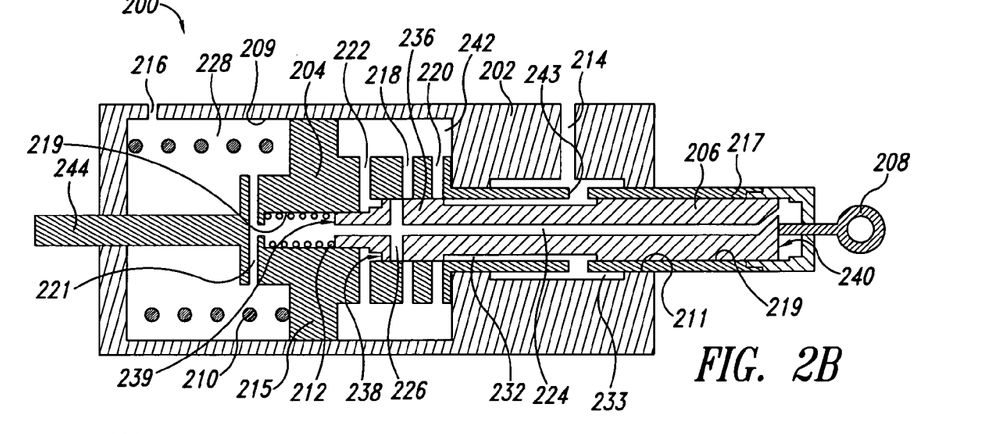
Figure 2C:
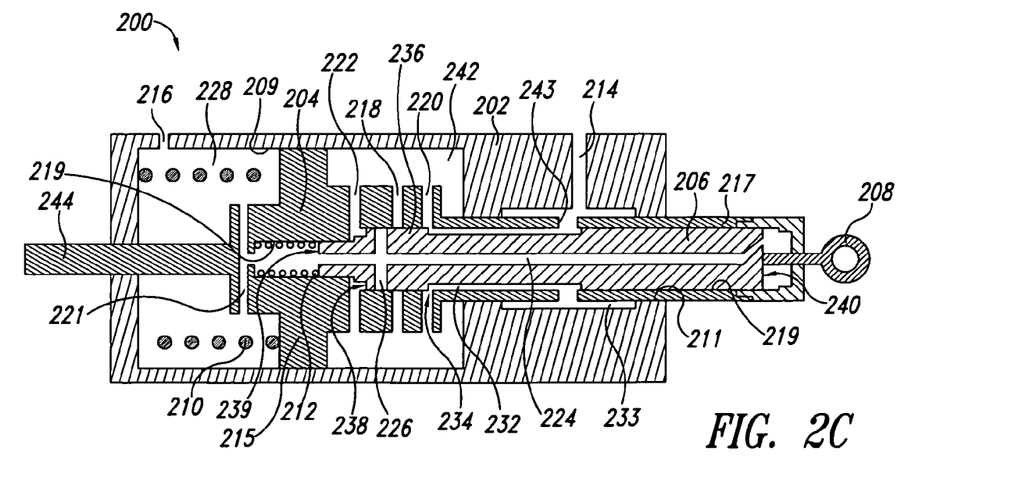

Turning now to FIGS. 2A-2C, a hydraulically operated brake booster 200 is illustrated, in accordance with an embodiment of the invention. The hydraulic brake booster 200 includes a housing 202, a boost piston 204, and a valve spool 206. The housing 202 comprises a cylinder bore 209 including a narrowed region 211 referred to hereafter as a shaft bore, a high-pressure fluid supply port 214, and a low-pressure fluid supply port 216. An annular recess 233 is positioned in the shaft bore 211. The boost piston 204 comprises a sealing land 215 positioned in the cylinder bore 209, an input shaft 217 extending into the shaft bore 211, and an output shaft 244 extending from the housing 202 and configured to engage a master cylinder braking piston. The sealing land 215 divides the cylinder bore 209 into a high-pressure chamber 242 and a low-pressure chamber 228. A piston bore 219 extends axially in the boost piston 204. A low-pressure-side vent 221 extends from the piston bore 219 to the low-pressure chamber 228 of the cylinder bore 209. A feedback port 222, a low-pressure port 218, and a high-pressure port 220 each extend from the piston bore 219 to the high-pressure chamber 242 of the cylinder bore 209. A high-pressure access port 243 extends between the piston bore 219 and the annular recess 233 of the shaft bore 211. A piston return spring 210 biases the boost piston toward the high-pressure region 242 of the cylinder bore 209.

The valve spool 206 is positioned in the piston bore 219, and comprises a valve land 236, an axial bore 224, an equalizing port 226, and a high-pressure annulus 232 positioned substantially opposite the annular recess 233 of the shaft bore 211, with the high-pressure access port 243 extending therebetween. A first pressure surface 239 and a second pressure surface 240 of the valve spool 206 are in fluid communication with each other via the axial bore 224, and with the low-pressure chamber 228 via the low-pressure-side vent 221 of the boost piston 204. A reaction surface 238 of the valve spool 206 is in fluid communication with the high-pressure chamber 242 via the feedback port 222 of the boost piston 204. A spool return spring 212, positioned in the axial bore 219, biases the valve spool toward the right, as viewed in the drawings. When incorporated into a braking system of a vehicle, the brake pedal of the vehicle is coupled to the valve spool 206 via a pushrod 208 in a manner similar to that illustrated in FIG. 1 with reference to the pushrod 130.

FIG. 2A shows the boost piston 204 and valve spool 206 in default positions, in which no pressure is applied to an associated brake pedal and no braking boost is applied by the output shaft 244. FIG. 2B shows the valve spool 206 in a ready position and the boost piston 204 still in its default position, and FIG. 2C shows the valve spool 206 in an active braking position and the boost piston 204 in a braking position. For the purposes of the present disclosure and claims, the term "active braking" refers to a condition in which applied braking force is increasing.

In operation, hydraulic fluid at high pressure is provided at the high-pressure fluid supply port 214 while a low-pressure fluid supply is coupled to the low-pressure fluid supply port 216. While no pressure is applied to the brake pedal, the boost piston 204 and valve spool 206 remain in their default positions as shown in FIG. 2A. If, because of previously applied pressure they are not already in their default positions, the boost piston 204 and valve spool 206 move thereto when pressure is removed from the brake pedal. In this configuration, the high-pressure chamber 242 of the cylinder bore 209 is in fluid communication with the low-pressure chamber 228 via the low-pressure port 218, the equalizing port 226, the axial bore 224, the piston bore 219, and the low-pressure-side vent 221. Accordingly, pressure in the high- and low-pressure chambers 242, 228 is equalized, and the piston return spring 210 holds the boost piston 204 at its rightmost extreme of travel.

When a driver applies pressure to the brake pedal, the pressure is transmitted to the valve spool 206 via the pushrod 208, moving the valve spool to the left. The valve spool 206 moves a first distance to the position shown in FIG. 2B during which no braking action occurs. This provides an amount of slack in the pedal travel before the brakes of the vehicles engage. With reference to FIG. 2B, it can be seen that the valve land 236 has closed the low-pressure port 218, thereby isolating the high-pressure chamber 242 from the low-pressure chamber 228.

When the driver moves the brake pedal beyond an active braking threshold, the valve spool 206 is moved further to the left into an active braking region, relative to the boost piston 204, in which the valve land 236 begins to open the high-pressure port 220 as indicated at 234 in FIG. 2C. This places the high-pressure chamber 242 in fluid communication with the high-pressure fluid supply port 214, whence fluid at high pressure begins to flow via the annular recess 233, the high-pressure access port 243, the high-pressure annulus 232, and the high-pressure port 220. As high-pressure fluid flows into the high-pressure chamber 242 of the cylinder bore 209, fluid pressure in the high-pressure chamber 242 increases, which drives the boost piston 204 to the left against the lower fluid pressure in the low-pressure chamber 228, and extending the output shaft 244 where it applies an amplified braking pressure to a piston of a master cylinder. Assuming that the driver does not move the brake pedal farther after applying the initial pressure, the boost piston 204 moves to the left while the valve spool 206 remains stationary, which closes the high-pressure port 220, arresting the boost piston 204. At this point, the boost piston is at some intermediate position within the cylinder bore, as shown in FIG. 2C, while the valve spool 206 is in the ready position relative to the boost piston 204, as shown in FIG. 2B. Because the high-pressure chamber 242 is isolated from both the high- and low-pressure fluid supply ports 214, 216 while the valve spool 206 is in the ready position, it is hydraulically locked where it is when the spool valve moves from active braking position to its ready position. Accordingly, the level of braking present when this occurs is maintained constant until the spool valve moves again.

While the valve spool 206 and boost piston 204 are in their default positions, as shown in FIG. 2A, the reaction surface 238 and the first and second pressure surfaces 239, 240 of the valve spool 206 are all subject to fluid pressure equal to the low-pressure fluid supply, so, apart from the bias applied by the spool return spring 212, the valve spool 206 can move freely within the piston bore 219. However, while the low-pressure port 218 is closed by the valve land 236, the reaction surface 238 is subject to the fluid pressure present in the high-pressure chamber 242, while the first and second pressure surfaces 239, 240 remain in fluid communication with the low-pressure chamber 228. Thus, as pressure rises in the high-pressure chamber 242, there is a corresponding rise in fluid bias against the reaction surface 238 urging the valve spool 206 to the right, which is not balanced by a corresponding bias or force in the other direction. This reaction force is transmitted via the pushrod 208 to the brake pedal, providing the driver with a feedback force that is proportional to the difference in pressure between the high- and low-pressure chambers 242, 228, and to the boosted braking force applied via the output shaft 244. Accordingly, the greater the pressure applied by the driver to the brake pedal, the greater the return pressure pushing back on the pedal.

When the driver removes pressure from the brake pedal, the combined return bias of the spool return spring 212 and the reaction pressure at the reaction surface 238 moves the valve spool 206 to its rightward limit of travel, which closes the high-pressure port 220 and opens the low-pressure port 218, permitting fluid to vent from the high-pressure chamber 242 to the low-pressure chamber 228 via the equalizing port 226, the axial bore 224, the piston bore 219, and the low-pressure-side vent 221. The piston return spring 210 then drives the boost piston 204 back to its default position, withdrawing the output shaft 244 and releasing the vehicle brakes.

The valve land 236 and the high-pressure port 220 control the rate and degree of braking. If the driver applies only sufficient pressure to open a small portion of the high-pressure port 220, high-pressure fluid flows slowly into the high-pressure chamber 242, and the boost piston 204 correspondingly responds slowly, and unless the driver continually increases the pressure on the pedal to offset the rising reaction force at the reaction surface 238, the boost piston 204 only travels a small distance before the valve land 236 re-closes the high-pressure port 220, as described above. In order to move the valve spool 206 back over the active braking threshold into the active braking region, the driver must apply additional force to the brake pedal. Thus, a force threshold necessary to move the valve spool 206 into the active braking position increases in direct relation to the degree of braking already present.

If, from the default position, the driver presses very hard on the brake pedal, the high-pressure port 220 opens fully, permitting high-pressure fluid to flow very quickly into the high-pressure chamber 242, the boost piston 204 moves very fast to the left, and holds the high-pressure port open longer, which in turn moves the boost piston 204 farther to the left before movement of the piston and increasing reaction forces move the valve spool 206 out of the active braking region to close the high-pressure port 220. Thus, the brakes will be applied very hard and very fast.

It can be seen that high-pressure fluid flows into the brake booster 200 only while the valve spool 206 is in the active braking region, and that low-pressure fluid flows both ways through the low-pressure fluid supply port 216 as the boost piston 204 moves back and forth, although there is a net outflow of fluid via the low-pressure fluid supply port 216 that is equal to the volume of fluid that enters the high-pressure fluid supply port 214 during braking events. There is no flow of high-pressure fluid into the brake booster while braking force is constant or while there is no brake force applied.

In the event fluid pressure is lost from the system, high-pressure fluid will not flow into the high-pressure chamber 242 in response to pressure on the brake pedal, so there will be no increase in bias against the reaction surface 238, and no power boost to the brakes. In such an event, the valve spool 206 will move with little resistance to the left until a portion of the valve spool 206 makes hard contact with the boost piston 204, at which point the driver's pressure on the pedal is transferred to the boost piston 204, moving the piston to the left, and extending the output shaft 244. Thus, a driver is able to apply the brakes even if the power assist capability is lost.

Figure 3:
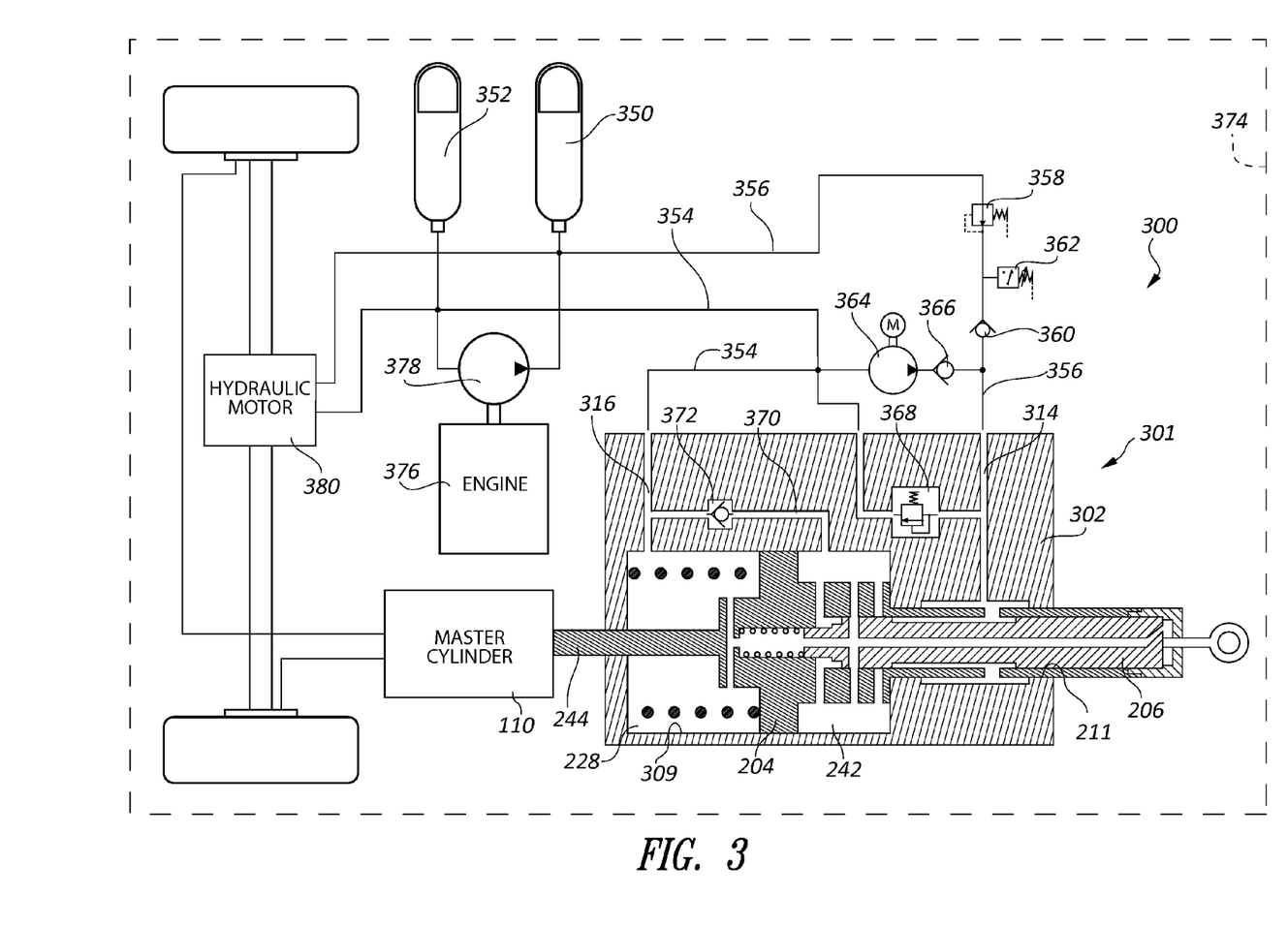
FIG. 3 shows a diagrammatical representation of a hybrid vehicle, including a hydraulically boosted brake system according to a second embodiment of the invention.

Turning now to FIG. 3, elements of a hybrid vehicle 374 are shown diagrammatically, including a hydraulically operated brake boosting system 300, according to an embodiment of the invention. Where elements of the boosting system 300 are indicated using reference numbers that are common to elements of the embodiment described with reference to FIGS. 2A-2C, it may be assumed that the corresponding elements are substantially identical, or that any differences are not relevant to the present disclosure. Such elements will not be described in detail with reference to the embodiment of FIG. 3.

The system 300 employs a brake booster 301 that includes a housing 302, a boost piston 204, and a valve spool 206. The housing 302 comprises a cylinder bore 309 that has high- and low-pressure chambers 242, 228 as described with reference to the embodiment of FIGS. 2A-2C, a shaft bore 211, a high-pressure fluid supply port 314 and a low-pressure fluid supply port 316. A bypass channel 370 may extend between the high-pressure chamber 242 and the low-pressure chamber 228 with a check valve 372 positioned therein, configured to permit a one-way flow of fluid from the low-pressure chamber 228 to the high-pressure chamber 242.

A high-pressure fluid source 350 is in fluid communication with the high-pressure fluid supply port 314 of the housing 302 via high-pressure fluid transmission lines 356, and a low-pressure fluid source 352 is in fluid communication with the low-pressure fluid supply port 316 via low-pressure fluid transmission lines 354. The high- and low-pressure fluid sources 350, 352 may be, for example, high- and low-pressure fluid accumulators, respectively, as shown in FIG. 3, or any other sources of such fluid supplies.

A pressure regulator 358 is positioned in the high-pressure fluid transmission lines 356 between the high-pressure fluid source 350 and the high-pressure fluid supply port 314; a pressure relief valve 368 is coupled between the high-pressure fluid supply port 314 and the low-pressure fluid source; a pressure switch 362 is coupled to the high-pressure side of the fluid circuit; a check valve 360 is positioned in the high-pressure side of the circuit between the high-pressure fluid source 350 and the high-pressure fluid supply port 314; and an electrically powered backup pump 364 is coupled between the high- and low-pressure sides of the fluid circuit with a check valve 366 configured to permit a one-way flow of fluid from the low-pressure side to the high-pressure side of the circuit.

While the braking system 300 is in operation, high-pressure fluid from the high-pressure fluid source 350 is supplied to the brake booster 301 to power the booster. The pressure regulator 358 limits the fluid pressure to within limits determined by the configuration of the booster 301 and the braking requirements of the associated vehicle. In particular, in a system where pressurized hydraulic fluid is employed by other vehicle systems as well as the braking system 300, the high-pressure fluid supply may be at a pressure that exceeds the design limits of the booster 301, in which case, the pressure regulator 358 can be provided to reduce the pressure supplied to the booster to an acceptable level.

For example, the hybrid vehicle 374 of FIG. 3 employs a hydraulic motor 380 as its secondary power source. An internal combustion engine 376 drives a fluid pump 378 to move fluid under very high pressure into the high-pressure hydraulic accumulator 350, where it is stored for later use in propelling the vehicle 374, as well as for other purposes. The accumulator 350 may have a pressure of more than 5,000 psi. Meanwhile, the prior art hydraulic booster system described with reference to FIG. 1 is designed to operate at a fluid pressure differential of around 900 psi. As will be explained later, there are some advantages to employing a boosting system according to the principles of the invention that in other respects is compatible with existing systems, and employing a pressure regulator such as the pressure regulator 358 of FIG. 3 to provide the necessary pressure reduction. According to other embodiments, the seals and working surfaces of the booster are sized and configured to provide appropriate brake boosting levels while operating in the range of 5,000-7,000 psi, thereby obviating the need for the pressure regulator. Alternatively, a pressure regulator may be provided, configured to limit the fluid pressure to the lower limit of the normal operating range of the vehicle's hydraulic system, thereby providing a consistent feel and response to the brakes in a system where the fluid pressure could routinely vary by 25%-40%.

The pressure relief valve 368 is configured to vent fluid to the low-pressure side of the circuit if the pressure of the fluid supplied at the high-pressure fluid supply port 314 unexpectedly increases beyond the design limits of the booster 301, such as if the pressure regulator 358 fails, thereby protecting the booster 301 and its associated components.

If the fluid pressure at the high-pressure source 350 drops below a selected limit adequate for proper operation of the booster 301, such as might occur, for example, because of a malfunction of an element that supplies the high-pressure fluid or because of a blockage in a fluid transmission line, the pressure switch 362 closes, activating the electric backup pump 364, which then begins operation to maintain adequate fluid pressure at the high-pressure fluid supply port 314 to permit operation of the system, at least until the malfunction of the high-pressure fluid supply can be corrected. The check valve 360 prevents fluid from the backup pump 364 from flowing up to the high-pressure fluid source 350. According to one embodiment, the pump 364 has a response time that is fast enough to allow the pump to stand idle until a braking event begins, at which time the pump starts and provides the required fluid pressure. In such a case, a second switch wired in series with the first can be positioned to detect the initial movement of the brake pedal and start the motor.

According to another embodiment of the invention, the backup pump 364 includes a small high-pressure fluid reservoir sufficient to initiate braking, after which the pump 364 starts and recharges the reservoir and supports ongoing braking. Such a reservoir is distinguished, for the purposes of this disclosure, from a high-pressure accumulator such as might be employed as the high-pressure fluid source, in that an accumulator is typically capable of storing much more fluid, and supporting repeated braking events, and may support a number of other hydraulically operated vehicle systems, where, in contrast, the reservoir holds only enough fluid to permit on-demand operation of the pump without delaying the booster response to a braking event. According to a further embodiment, the positions of the pressure switch 362 and the check valve 360 are reversed, and the pump 364 merely charges the high-pressure side of the circuit until the switch 362 opens. When a braking event occurs, the minimal storage capacity of the transmission lines and components in the high-pressure side of the circuit is sufficient to initially power a braking event until the pump can start and maintain the pressure.

The bypass channel 370 serves to prevent hydraulic locking of the boost piston in the event a blockage occurs in the low-pressure side of the circuit that partially or completely blocks a flow of fluid from the low-pressure fluid supply port 316 to the low-pressure fluid source.

Some of the components described with reference to FIG. 3 are shown as being incorporated into the housing 302, while others are shown as being external to the housing. This configuration is merely exemplary, and is subject to the design considerations of a particular application. Additionally, the embodiments of FIGS. 2A-3 are shown in substantially diagrammatic and schematic form to more easily describe the function and operation of the respective embodiments. Thus, the appearance of some operational embodiments of the invention may be significantly different than that of the embodiments shown in the drawings, including the operational embodiment illustrated in FIG. 4. Accordingly, the claims are not limited to a particular appearance, arrangement, or combination of elements, except as explicitly recited therein.

Figure 4:
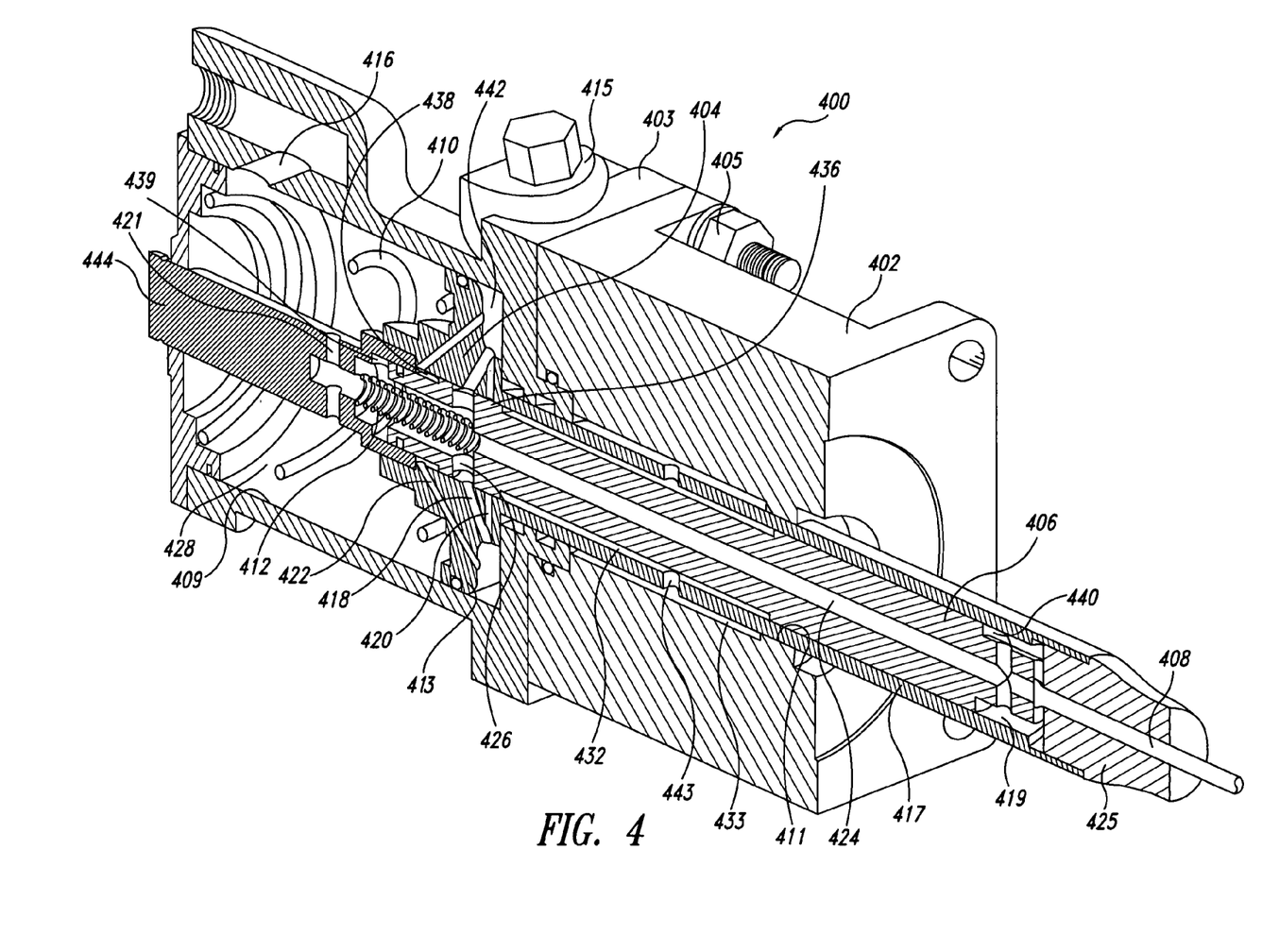
FIG. 4 shows a cutaway view of a hydraulic brake booster according to a third embodiment of the invention.

Referring now to FIG. 4, a cutaway view of a hydraulically operated brake booster 400 is shown according to an embodiment, in which are employed the housing 403 and other elements from a prior art booster of a type similar to the booster 102 described with reference to FIG. 1. The housing 403 comprises a cylinder bore 409 and inlet and outlet fluid ports 415, 416. An extension housing 402 comprises a shaft bore 411, a high-pressure fluid supply port (not shown in the view of FIG. 4) and an annular recess 433 positioned in the shaft bore 411. The extension housing 402 is coupled to the housing 403 by appropriate fasteners 405 such that the shaft bore 411 of the extension housing 402 and the cylinder bore 409 of the housing 403 are contiguous and coaxial. Because high-pressure fluid is supplied to the booster 400 via the high-pressure fluid supply port of the extension housing 402, the original inlet port 415 of the housing 403 is sealed.

A boost piston 404 comprises a sealing land 413 positioned in the cylinder bore 409, an input shaft 417 extending into the shaft bore 411, and an output shaft 444 extending from the housing 403 and configured to engage a master cylinder braking piston. In the illustrated embodiment, a portion of the boost piston 404 including the output shaft 444 is a separate element, with the two parts forming the boost piston 404. A piston bore 419 extends axially in the boost piston 404. The sealing land 413 divides the cylinder bore 409 into a high-pressure chamber 442 and a low-pressure chamber 428. A low-pressure-side vent 421 extends from the piston bore 419 to the low-pressure chamber 428 of the cylinder bore 409. A feedback port 422, a low-pressure port 418, and a high-pressure port 420 each extend from the piston bore 419 to the high-pressure chamber 442 of the cylinder bore 409. A high-pressure access port 443 extends between the piston bore 419 and the annular recess 433 of the shaft bore 411. A piston return spring 410 biases the boost piston 404 toward the high-pressure region 442 of the cylinder bore 409.

A valve spool 406 is positioned in the piston bore 419 and comprises a valve land 436, an axial bore 424, an equalizing port 426, and a high-pressure annulus 432 positioned substantially opposite the annular recess 433 of the shaft bore 411, with the high-pressure access port 443 extending therebetween. A first pressure surface 439 and a second pressure surface 440 of the valve spool 406 are in fluid communication with each other via the axial bore 424, and with the low-pressure chamber 428 via the low-pressure-side vent 421 of the boost piston 404. A reaction surface 438 of the valve spool 406 is in fluid communication with the high-pressure chamber 442 via the feedback port 422 of the boost piston 404. A spool return spring 412 biases the valve spool toward the right, as viewed in FIG. 4. A pushrod 408 configured to be coupled to a vehicle brake pedal extends outward from the input shaft 417 through an end cap 425 that seals the piston bore 419.

Operation of the hydraulic brake booster 400 is substantially identical to the operation of the brake booster 200 described with reference to FIGS. 2A-2C, and thus will not be described.

The embodiment of FIG. 4 provides for an economical retrofit of existing prior art systems to permit them to operate in accordance with the principles of the invention. In the embodiment of FIG. 4, a number of components are retained from a prior art booster, including the housing 403, the piston return spring 410, the spool return spring 412, and the end cap 425. Additionally, the original backup pump (not shown) is repositioned and reconfigured to operate as described with reference to the backup pump 364 of FIG. 3. By configuring the new components to operate at the pressure of the prior art booster, they can be sized to fit the original housing. This will require a pressure regulator where system pressure exceeds the design pressure of the prior art booster, as described with reference to FIG. 3, but this will provide the advantage that many off-the-shelf components will be compatible with the booster system, including fittings, seals, hoses, etc., and will reduce the cost of all components, as compared to the cost of components capable of withstanding much higher system pressure.

The ports and vents described with reference to the embodiments of FIGS. 2A-4, including the high- and low-pressure ports, the feedback port, etc., each comprise a plurality of radially extending passages. Two passages each are shown in FIG. 4, but the number and size of each set of passages for a given application is determined according to the maximum fluid flow that the respective port may be required to support. Additionally, the function of disclosed elements such as, for example, the annular recess, the high-pressure annulus, and the valve land may be performed by elements having distinct structures, such as grooves, channels, poppets, etc., without departing from the scope of the invention.

Figure 5A:
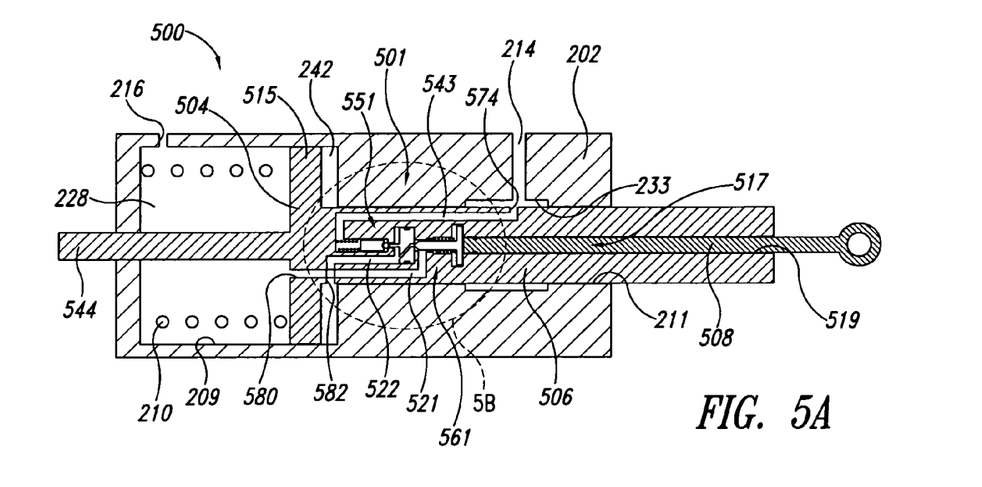
FIG. 5A shows a diagrammatical representation of a hydraulic brake booster according to a fourth embodiment of the invention.
Figure 5B:
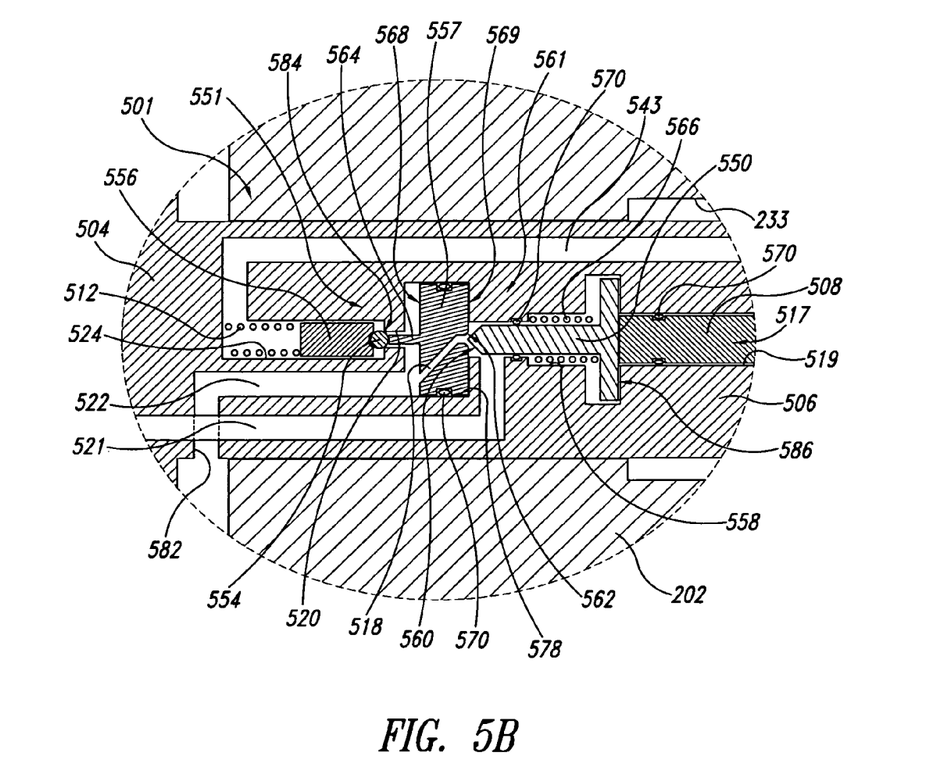
FIGS. 5B-5D show, in a detailed view, a portion of the hydraulic brake booster of FIG. 5, in default, ready, and active braking positions, respectively.
Figure 5C:
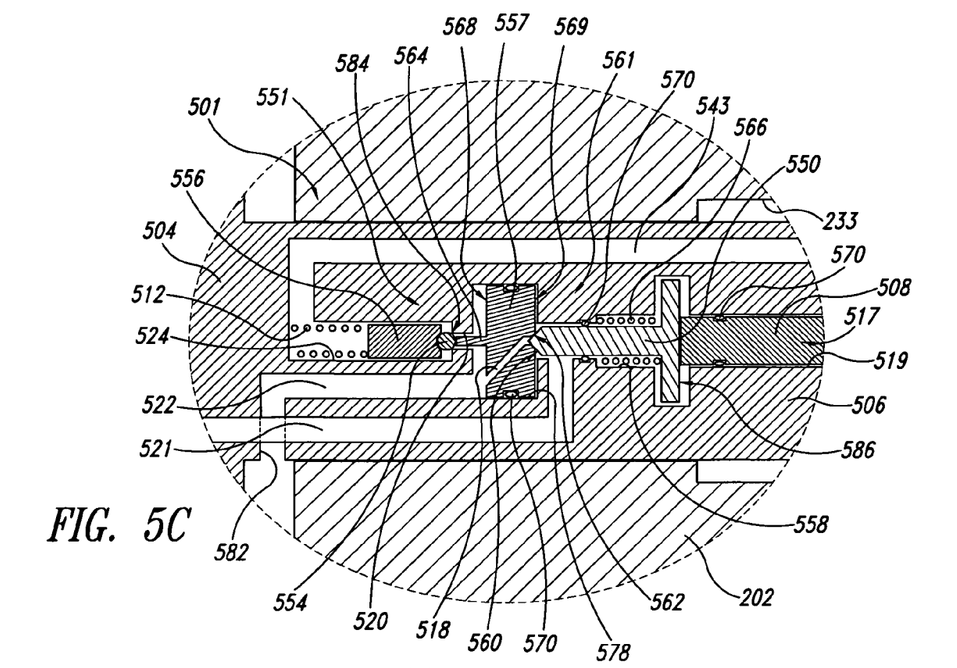
Figure 5D:
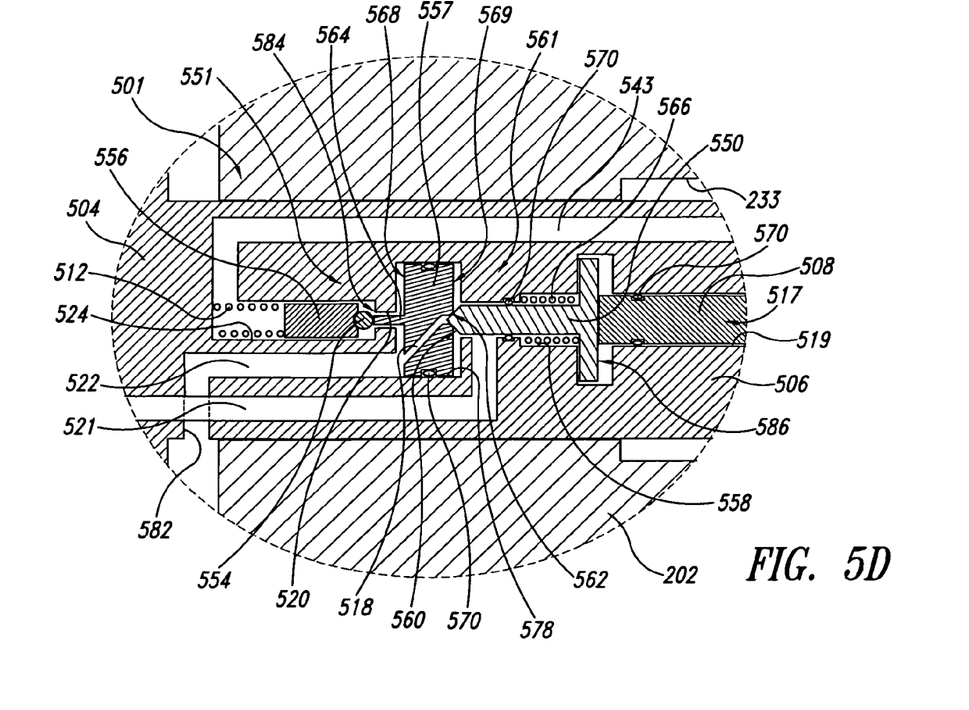

Turning now to FIGS. 5A-5D, FIG. 5A shows a hydraulically operated brake booster 500, according to another embodiment, and FIGS. 5B-5D show an enlarged view of a portion of the brake booster 500 according to respective configurations as described below. The brake booster 500 comprises a housing 202, a boost piston 504, and a pushrod 508. The housing 202 is substantially identical to the housing 202 described with reference to FIGS. 2A-2C, and includes a cylinder bore 209, a shaft bore 211, a high-pressure fluid supply port 214, a low-pressure fluid supply port 216, and an annular recess 233 substantially as described above.

The boost piston 504 comprises a sealing land 515 positioned in the cylinder bore 209, a piston body 506 extending into the shaft bore 211, and an output shaft 544 extending from the housing 202 and configured to engage a master cylinder braking piston. The sealing land 515 divides the cylinder bore 209 into a high-pressure chamber 242 and a low-pressure chamber 228. Elements of a valve assembly 501 extend axially in the piston body 506 of the boost piston 504 and are comprised by a piston bore 517, the elements including a pushrod channel 519, a needle valve chamber 558, a valve piston chamber 578, high-pressure fluid passage 520, and a ball valve chamber 524. A high-pressure supply channel 543 extends within the piston body 506 from an aperture 574 to the ball valve chamber 524. The aperture 574 is positioned to place the high-pressure supply channel 543 in fluid communication with the ball valve chamber 524 via the annular recess 233. A low-pressure-side channel 521 extends within the boost piston 504 from an aperture 580 to the needle valve chamber 558, placing the needle valve chamber 558 in fluid communication with the low-pressure chamber 228 and the low-pressure fluid supply port 216 of the cylinder bore 209. A high-pressure-side channel 522 extends from an aperture 582 to the valve piston chamber 578 placing the valve piston chamber 578 in fluid communication with the high-pressure chamber 242 of the cylinder bore 209.

The valve assembly 501 includes two poppet-type valves: a ball valve 551 and a needle valve 561. The ball valve 551 comprises a valve ball 554, a spacer 556, and a spring 512, positioned in the ball valve chamber 524 so that the spring 512 applies a bias force to the spacer 556, which transmits the bias force to the valve ball 554, biasing the valve ball against a valve seat 584 at a first end of the high-pressure fluid passage 520. The spacer is configured so as not to impede passage of fluid through the ball valve chamber 524. The valve assembly 501 also includes a valve piston 557 positioned in the valve piston chamber 578 with a high-pressure surface 568 and a low-pressure surface 569, and including an actuator rod 564 extending from the high-pressure surface 568 into a second end of the high-pressure fluid passage 520 toward the valve ball 554 of the ball valve 551.

The needle valve 561 includes a fluid passage 518 extending in the valve piston 557 from a valve seat 562 in the low-pressure surface 569 of the valve piston to an aperture in the high-pressure surface 568 of the valve piston, placing the portion of the valve piston chamber 578 on the side of the high-pressure surface 568 in fluid communication with the portion on the side of the low-pressure surface 569. The needle valve 561 also includes a valve needle 550 and a spring 566. The valve needle 550 is positioned in the needle valve chamber 558 and includes an enlarged head with a bearing surface 586 at a first end and a sealing surface 560 at a second end. The valve needle 550 is positioned with the second end extending toward the valve piston chamber 578. The spring 566 is positioned in the valve piston chamber 578 to bias the valve needle 550 away from the valve piston chamber 578.

The pushrod 508 is configured at a first end to be coupled to a brake pedal of a vehicle in the manner shown, for example, with respect to the pushrod 130 of FIG. 1. The pushrod 508 extends into the pushrod channel 519 with a second end positioned adjacent to the bearing surface 586 of the valve needle 550.

In operation, hydraulic fluid at high pressure is provided at the high-pressure fluid supply port 214 while a low-pressure fluid supply is coupled to the low-pressure fluid supply port 216. The first end of the pushrod 508 is coupled to a vehicle brake pedal and the output shaft 544 engages the piston of a master brake cylinder of the vehicle such that leftward movement of the output shaft drives the piston to apply braking force to the vehicle brakes.

FIGS. 5A and 5B show the valve assembly 501 in a default position corresponding, functionally, with the configuration of the brake booster 200 described above with reference to FIG. 2A. In this position, the ball valve 551 is closed, with the valve ball 554 biased against the valve seat 584 by the spring 512, preventing high-pressure fluid from entering the valve piston chamber 578 via the high-pressure fluid passage 520. The needle valve 561 is open, with the valve needle 550 biased in the open position by the spring 566, and the high- and low-pressure chambers 242, 228 in fluid communication via the low-pressure-side channel 521, the needle valve chamber 558, valve piston chamber 578 and the fluid passage 518 of the valve piston 557, and the high-pressure-side channel 522. The valve assembly 501 moves to the default position when braking pressure is removed from the brake pedal of the vehicle, and remains in the default position while there is no pressure applied to the brake pedal.

FIG. 5C shows the valve assembly 501 in a ready position corresponding, functionally, with the configuration of the brake booster 200 described above with reference to FIG. 2B. When a driver begins to apply pressure to the brake pedal, the pushrod 508 moves leftward, as viewed in the drawings, against the bearing surface 586 of the valve needle 550, moving the valve needle leftward until the sealing surface 560 engages the valve seat 562 of the valve piston 557, closing the needle valve 561 and breaking the fluid communication between the high- and low-pressure chambers 242, 228.

FIG. 5D shows the valve assembly 501 in an active braking position corresponding, functionally, with the configuration of the brake booster 200 described above with reference to FIG. 2C. When a driver increases the pressure to the brake pedal beyond that necessary to maintain the valve assembly 501 in the ready position, biasing force is transmitted to the valve piston 557 via the pushrod 508 and the valve needle 550, moving the valve piston leftward until the actuator rod 564 contacts the valve ball 554 and moves the valve ball away from the valve seat 584, opening the ball valve 551 and placing the high-pressure fluid supply port 214 in fluid communication with the high-pressure chamber 242 via the annular recess 233, the high-pressure supply channel 543, the ball valve chamber 524, the high-pressure fluid passage 520, the valve piston chamber 578, and the high-pressure-side channel 522. Accordingly, high-pressure fluid flows into the high-pressure chamber 242 and compels the boost piston 504 to move rightward within the cylinder bore 209, and the output shaft 544 transmits braking force to the master cylinder as described above.

The rate of flow of high-pressure fluid to the high-pressure chamber 242, and thus the speed at which braking force increases, is controlled by the ball valve 551, and in particular, by the distance of the valve ball 554 from the valve seat 584, which in turn is controlled by the amount of force applied to the brake pedal. The position of the booster piston 504 within the cylinder bore 209 of the housing 202 is determined by the pressure differential between the high- and low-pressure chambers 242, 228, balanced against the force of the return spring 210 and resistance by the master cylinder. On the other hand, the positions of the pushrod 508, the valve needle 550, the valve piston 557, and the valve ball 554, relative to the housing 202, are determined, within the limits imposed by the structure of the boost piston 504, by the position of the brake pedal. Assuming the driver applies an initial force to the brake pedal sufficient to move the valve assembly 501 to the active braking position, and then holds the pedal stationary, high-pressure fluid will initially flow into the high-pressure chamber 242 as described above. As the boost piston 504 moves leftward in response, the body 506, with all its chambers and passages, also moves leftward until the valve seat 584 moves back into contact with the valve ball 554 at its new position, breaking the fluid communication between the high-pressure fluid supply port 214 and the high-pressure chamber 242 and arresting the boost piston 504 at that position. At this point, the valve assembly 501 is again in the ready position, and the degree of braking force attained is maintained constant until the driver either further depresses the brake pedal, which reopens the ball valve 551 and increases the braking pressure, or releases the pedal, which allows the spring 566 to open the needle valve 561 and bleed fluid from the high-pressure chamber 242 to the low-pressure chamber 228. If the driver fully releases the brake pedal, the booster piston 504 will return to its rightmost position as shown in FIG. 5A, and the valve assembly will return to the default position. If the driver only partially releases the pedal, the needle valve 561 will bleed sufficient fluid to permit the boost piston 504 to move rightward until the valve seat 562 of the valve piston 557 moves into contact with the sealing surface 560 of the valve needle 550, closing the needle valve and arresting the booster piston 504 at some reduced braking position.

While a pressure differential is present between the high- and low-pressure chambers 242, 228, that same differential is present across the valve piston 557, with the higher pressure on the surface side of the piston and the lower pressure on the low-pressure surface side. Thus, as the pressure differential increases during active braking, a correspondingly increasing rightward bias is applied against the high-pressure surface 568 of the valve piston 557, which is felt by the driver as an increasing resistance to pressure on the brake pedal, thereby providing a proportional feedback force to the driver Hydraulic brake boosting systems according to the various embodiments of the invention provide a number of advantages and benefits. As noted above, prior art hydraulic boosters require a continuous flow of fluid, and thus necessitate the constant operation of a fluid pump, which represents a significant energy drain on the engine of the vehicle. In contrast, the brake booster systems described herein draw high-pressure fluid only during active braking, which represents a small fraction of the total operating time of the vehicle, and which, according to tests conducted under the inventors' direction, represents a significant efficiency improvement over conventional hydraulically boosted systems.

Additionally, where a vehicle, such as a hydraulic hybrid vehicle, for example, employs a hydraulic accumulator and a brake booster configured in accordance with the principles of the invention, the fluid stored in the accumulator is sufficient to power the brake booster for extended use with the engine off, where a conventional booster would quickly drain the accumulator because of the need for constant fluid circulation. The same is true for electric hybrid vehicles that employ electrically driven fluid pumps to drive a prior art brake booster during engine-off operation. The constant power draw of the electric pumps significantly affects the range of the vehicle when operating under stored power. On the other hand, were such a vehicle to employ an on-demand pump according to a scheme, for example, similar to one of those described above with reference to the backup pump 364 of FIG. 3, the drain on the battery would be greatly reduced and the vehicle range correspondingly increased.

Finally, because of the low fluid flow requirements of brake booster systems according to various embodiments of the invention, conventional vehicles (i.e., non-hybrid vehicles) can be provided with a small accumulator with limited capacity that is nevertheless capable of providing sufficient boosting capacity to brake a vehicle until it can be safely stopped, even when engine power is lost.

A hydraulic brake booster based on the operation of a poppet valve, such as that described with reference to FIGS. 5A-5D, provides a number of particular advantages, in addition to those discussed above. For example, manufacturing tolerances and costs are generally lower for poppet valves than for most other valves; fluid leakage of poppet valves is generally much less than that of more complex valve types such as spool valves, etc.; and, where valves that require shear movement of elements for operation are subject to jamming due to debris in the fluid, poppet valves tend instead to crush or blow such debris through, and are thus more reliable in consumer applications where regular maintenance may not occur.

In general, seals, gaskets, o-rings, etc., have not been described or shown in detail with regard to the disclosed embodiments but have been largely omitted to simplify the drawings. Appropriate use and application of such elements is well understood in the art, and thus a detailed discussion of such is not required for a complete understanding of the principles of the invention. Where seals are shown, they are shown as elements of specific embodiments, and are not to be construed as being essential in every embodiment, unless specifically claimed as such.

In describing the embodiments illustrated in the drawings, directional references, such as right, left, top, bottom, etc., are used to refer to elements or movements as they are shown in the figures. Such terms are used to simplify the description and are not to be construed as limiting the claims in any way.

Where the term move, and terms that suggest movement or changes of position, are used in the claims, these are to be construed as broadly as is reasonable in view of the specification. For example, where a claim recites movement of a first element to achieve a change in relative position of the first element and a second element, the claim also reads on movement of the second element relative to the first that results in a similar change in relative position; and where a claim recites movement of a valve, this is not to be construed as requiring that the entire valve physically change position, but only that a transmission characteristic of the valve change, e.g., that the valve moves from open to closed, etc.

Ordinal numbers, e.g., first, second, third, etc., are used in the claims merely for the purpose of clearly distinguishing between claimed elements or features thereof. The use of such numbers does not suggest any other relationship, e.g., order of operation or relative position of such elements. Furthermore, ordinal numbers used in the claims have no specific correspondence to those used in the specification to refer to elements of disclosed embodiments on which those claims may read.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

Elements of the various embodiments described above can be omitted or combined, and further modifications can be made, to provide further embodiments without deviating from the spirit and scope of the invention. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

The invention claimed is:
1. A brake booster, comprising:
a housing including a cylinder bore having high-pressure and low-pressure fluid supply ports;
a piston positioned within the cylinder bore, having:

a piston seal that separates a first pressure chamber of the cylinder bore from a second pressure chamber of the cylinder bore,
a piston bore extending axially within the piston,
a first port extending between the piston bore and the first pressure chamber,
a second port extending between the piston bore and the second pressure chamber, and
a third port extending between the piston bore and the second pressure chamber; and
a valve spool positioned within the piston bore, having:
a first fluid channel extending axially within the valve spool, the first fluid channel of the valve spool being in fluid communication with the cylinder bore via the piston bore and the first port,
a second fluid channel extending in the valve spool, in fluid communication with the high-pressure fluid supply port,
an equalizing port extending in the valve spool and positioned such that while the valve spool is in a first position, the equalizing port places the third port in fluid communication with the first fluid channel, and
a valve land positioned and configured such that, while the valve spool is in the first position, the second port is closed; while the valve spool is in a second position, the second and third ports are closed; and while the valve spool is in a third position, the third port is closed and the second port is in fluid communication with the high-pressure fluid supply port via the second fluid channel.

2. The brake booster of claim 1 wherein the valve spool comprises a reaction surface and the piston comprises a fourth port extending between the piston bore and the second pressure chamber, placing the reaction surface in fluid communication with the second pressure chamber while the valve spool is in any of the first, second, and third positions.

3. The brake booster of claim 1, further comprising:
a first spring positioned in the cylinder bore and configured to bias the piston toward the second pressure chamber; and
a second spring positioned in the piston bore and configured to bias the valve spool toward the first position.

4. The brake booster of claim 1, further comprising a pressure regulator configured to limit fluid pressure at the high-pressure fluid supply port.

5. The brake booster of claim 1, further comprising:
a fluid pump having a fluid inlet in fluid communication with the low-pressure fluid supply port and a fluid outlet in fluid communication with the high-pressure fluid port;
a check valve configured to permit one-way flow of fluid via the fluid pump from the low-pressure fluid supply port to the high-pressure fluid supply port; and
a pressure switch configured to activate the fluid pump when fluid pressure at the high-pressure fluid supply port drops below a threshold.

6. A hydraulic booster, comprising:
a housing configured to be coupled to a master cylinder, and having a cylinder bore and first and second fluid supply ports;
a piston, having first and second sides, positioned within the cylinder bore with the first fluid supply port opening into the cylinder bore on the first side of the piston and in fluid communication therewith, the piston configured to move within the cylinder bore in response to a difference in fluid pressures between the first and second sides of the piston, the piston further having:
a piston bore extending axially therein,
a first fluid port extending between piston bore and the second side of the piston, and
a second fluid port extending between the piston bore and the second side of the piston; and
a valve spool positioned within the piston bore and movable to any of three valve positions, including:
a first valve position, in which a land of the valve spool closes the first fluid port and the first and second sides of the piston are placed in fluid communication with each other via the second fluid port,
a second valve position, in which the land closes the first and second fluid ports, and
a third position in which the land closes the second fluid port and the first fluid port is placed in fluid communication with the second fluid supply port.

7. The hydraulic booster of claim 6 wherein the valve spool comprises a reaction surface in fluid communication with the second side of the piston, and wherein fluid pressure at the reaction surface biases the valve toward the first position in direct relation to a difference of pressure between the second and first sides of the piston.

8. The hydraulic booster of claim 6 wherein the third position comprises a range of positions of the valve spool in which the first fluid port is in fluid communication with the second fluid supply port via a fluid passage that progressively increases in size from a first extreme of the range to a second extreme.

9. The hydraulic booster of claim 7 wherein the piston comprises a third fluid port extending from the piston bore to the second side of the piston and that places the reaction surface in fluid communication with the second side of the piston.

10. The hydraulic booster of claim 6 wherein, while the valve spool is in either of the first or second positions, the second fluid supply port is closed.

11. The hydraulic booster of claim 6 wherein the piston includes a third port extending between the piston bore and the first side of the piston, and while in the first valve position, the valve spool places the second port in fluid communication with the first side of the piston via the third port.

12. A hydraulic booster, comprising:
a housing configured to be coupled to a master cylinder, and having a cylinder bore and first and second fluid supply ports;
a piston, having first and second sides, positioned within the cylinder bore with the first fluid supply port opening into the cylinder bore on the first side of the piston and in fluid communication therewith, the piston configured to move within the cylinder bore in response to a difference in fluid pressures between the first and second sides, the piston further having a valve assembly movable to any of three valve positions, including:
a first valve position, in which the first and second sides of the piston are placed in fluid communication with each other,
a second valve position, in which the first side of the piston is isolated from the second side of the piston, and
a third valve position, in which the first side of the piston is isolated from the second side of the piston and the second side of the piston is placed in fluid communication with the second fluid supply port,
the valve assembly including first and second poppet-type valves, the first valve configured to regulate fluid communication between the first and second sides of the piston, and the second valve configured to regulate fluid communication between the second side of the piston and the second fluid supply port and wherein movement of a poppet of the first valve a first distance in a first direction moves a sealing surface of the poppet of the first valve against a valve seat of the first valve and movement of the poppet of the first valve a second distance in the first direction moves an element comprising the valve seat of the first valve against a poppet of the second valve and moves the poppet of the second valve away from a valve seat of the second valve.

13. The hydraulic booster of claim 12 wherein, when the valve is in the first position, the first valve is open and the second valve is closed, when the valve is in the second position, the first and second valves are closed, and when the valve is in the third position, the first valve is closed and the second valve is open.

14. The hydraulic booster of claim 12 wherein the first valve is a needle valve, and the second valve is a ball valve.

15. The hydraulic booster of claim 12 wherein the valve assembly comprises a reaction surface in fluid communication with the second side of the piston, and wherein fluid pressure at the reaction surface biases the valve assembly toward the first valve position in direct relation to a difference of pressure between the first and second sides of the piston.

16. The hydraulic booster of claim 15 wherein fluid pressure at the reaction surface applies a closing bias to the second valve.

17. A brake boosting system of a vehicle, comprising:
a high-pressure fluid accumulator configured to supply fluid pressure for motive power for propelling the vehicle via a rotary hydraulic motor;
a low-pressure fluid accumulator;
a master brake cylinder; and
a brake booster having a high-pressure fluid supply port coupled to the high-pressure fluid accumulator, a low-pressure fluid supply port coupled to the low-pressure fluid accumulator, and a boost piston positioned within a cylinder bore and coupled to the master brake cylinder, the brake booster configured to place first and second sides of the boost piston in fluid communication with each other and with the low-pressure fluid accumulator while a brake pedal of the vehicle is in a default position, to place the first side of the boost piston in fluid communication with the low-pressure fluid accumulator and isolate the second side of the boost piston from the first side and from the high- and low-pressure fluid accumulators while the brake pedal is not at the default position and is depressed less than a threshold, and to place the second side of the piston in fluid communication with the high-pressure accumulator and the first side of the piston in fluid communication with the low-pressure accumulator while the brake pedal is depressed farther than the threshold.

18. The brake boosting system of claim 17 wherein the brake booster is configured to control a size of a passage between the high-pressure accumulator and the second side of the piston in relation to a pressure applied to the brake pedal while the brake pedal is depressed farther than the threshold.

19. The brake boosting system of claim 17 wherein movement of the boost piston in response to flow of high-pressure fluid to the second side of the boost piston moves the threshold farther from the default position.

* * * * *